United States Patent [19]
Nagatomo

[11] 3,918,556
[45] Nov. 11, 1975

[54] AUTOMATICALLY ADJUSTING BRAKING DEVICE

[75] Inventor: Masatugu Nagatomo, Hirakata, Japan

[73] Assignee: Kabushiki Kaisha Komatsu Seisakusho, Tokyo, Japan

[22] Filed: July 2, 1974

[21] Appl. No.: 485,201

[52] U.S. Cl. .................... 188/77 R; 188/196 BA
[51] Int. Cl.² ................................ F16D 49/20
[58] Field of Search ..... 188/77 R, 79.5 K, 79.5 GC, 188/196 BA

[56] References Cited
UNITED STATES PATENTS

| | | |
|---|---|---|
| 3,103,991 | 9/1963 | Flinn .................................. 188/77 R |
| 3,184,006 | 5/1965 | Fox .................................... 188/77 R |
| 3,473,632 | 10/1969 | Kimura et al ............. 188/196 BA X |
| 3,820,636 | 6/1974 | Kass .................................... 188/77 R |

*Primary Examiner*—Duane A. Reger
*Attorney, Agent, or Firm*—Armstrong, Nikaido & Wegner

[57] ABSTRACT

An automatically adjusting braking device in a band brake for a vehicle for adjusting automatically the gap between the brake drum and lining, and which has an engaging rod projecting from the end of a piston rod, and a feed mechanism provided at the end of the engaging rod, thus a reduction in the braking force due to wearing of the brake lining is prevented.

3 Claims, 4 Drawing Figures

AUTOMATICALLY ADJUSTING BRAKING DEVICE

This invention relates to a hydraulic braking device of the band type used mainly in construction machinery vehicles, and more particularly to an automatically adjusting braking device for automatically adjusting the gap between a lining and a brake drum when the lining is worn.

It is an object of the present invention to provide an automatically adjusting braking device in a band brake for a vehicle to automatically adjusting the gap between a lining and a brake drum which may prevent the braking force from being reduced due to the wear of the lining.

It is another object of the present invention to provide an automatically adjusting braking device in a band brake for a vehicle for automatically adjusting the gap between a lining and a brake drum which may prevent the stroke distance of the brake pedal from being increased.

According to the automatically adjusting braking device in a band brake of the present invention, the gap between the lining and the brake drum is automatically adjusted to a proper distance by operating a one-way clutch by means of feed mechanism provided at the upper portion of an adjusting bolt in the automatically adjusting braking device, when the gap exceeds a predetermined range.

These and other objects, features and advantages of an automatically adjusting braking device according to the present invention will become more fully apparent from the following description taken in conjunction with the accompanying drawings, in which.

Figure 1:
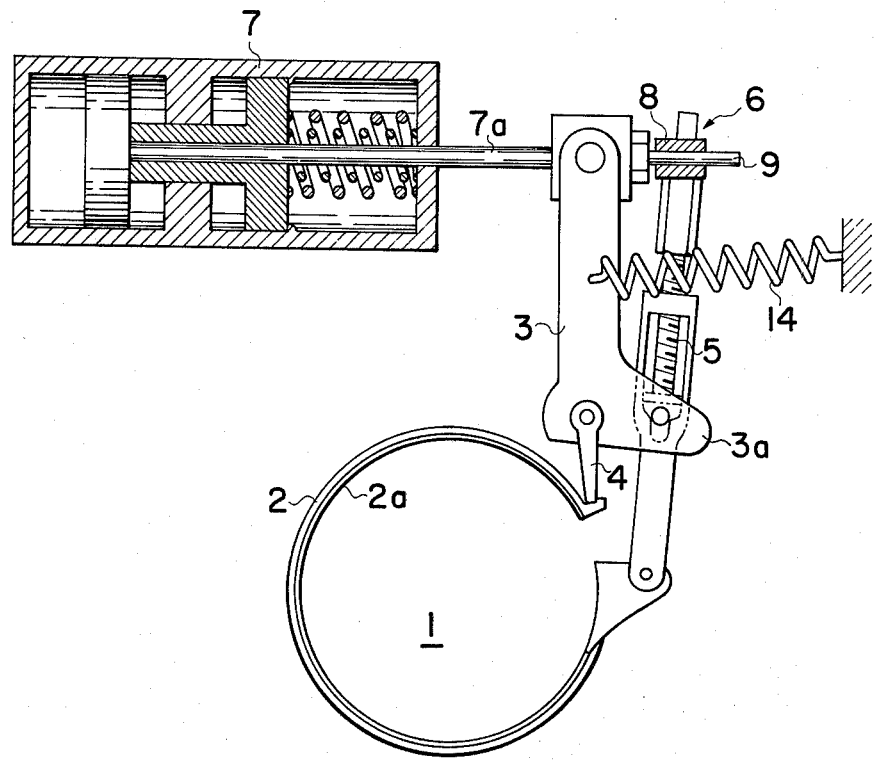
FIG. 1 is a schematic view of the entire braking device of one embodiment of the present invention.
Figure 2:
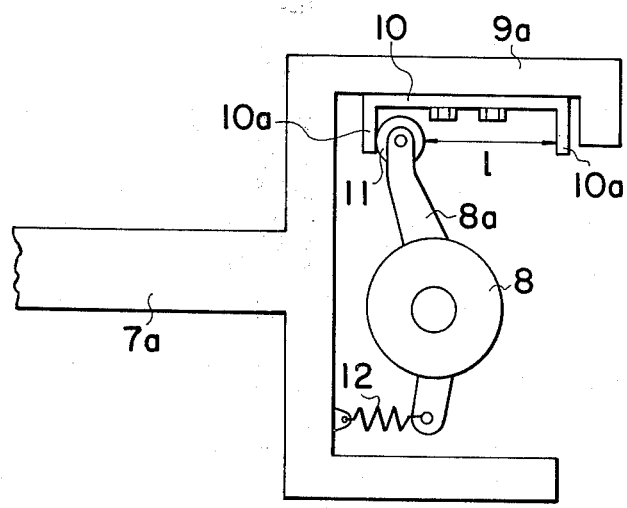
FIG. 2 is an expanded plane view of the essential part of the braking device of the present invention.
Figure 3:
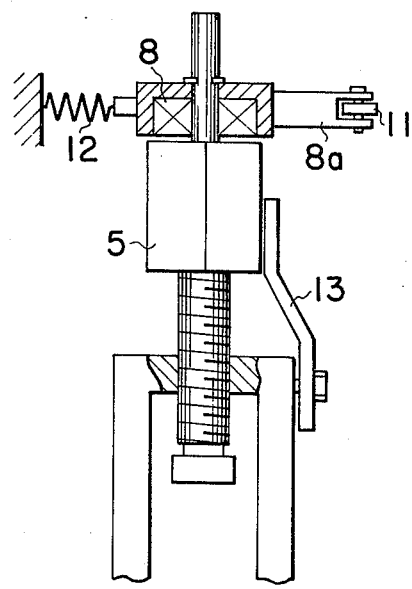
FIG. 3 is a back view of the braking device.

Referring now to FIGS. 1 to 3, which show one embodiment of the braking device of the present invention, numeral 1 indicates a brake drum secured to a construction vehicle (not shown), 2 a brake band, in which a lining 2a is provided on the inner surface thereof, one end of which is engaged with a claw 4 projected from the base of an anchor 3, the other end of which is journalled with the lower end of an adjusting bolt 5 provided at the operating portion 3a of an anchor 3 around the periphery of the brake drum 1. The upper end of the anchor 3 is connected to the end of the piston rod 7a of the hydraulic cylinder 7 as will be hereinafter described in greater detail, and the adjusting bolt 5 is so provided as to adjust freely the gap between the peripheral surface of the brake drum 1 and the lining 2a provided on the brake band 2 by rotating the adjusting bolt 5, and a feed mechanism 6 is provided at the upper portion thereof. The feed mechanism 6 is composed of the one-way clutch 8 provided at the upper end of the adjusting bolt 5 and an engaging rod 9 provided at the end of the piston rod 7a for driving the clutch 8. The level 8a of the one-way clutch 8 is projected toward one branch rod 9a of the engaging rod 9, and it is engaged through a roller 11 with a leaf spring 10 of substantially U-shaped and provided at the inside of the branch rod 9a. The leaf spring 10 is so provided as to add a slight addition to the gap between the brake drum 1 and the lining 2a at a distance l between the engaging portion 10a formed at both ends of the leaf spring 10 and the roller 11. At the opposite side of the lever 8a, is tensioned a weak tension spring 12 from the engaging rod 9 so as to prevent the one-way clutch 8 from being rotated due to the vibration. Reference numeral 13 is a leaf spring for preventing the adjusting bolt 5 from being rotated due to vibration. Numeral 14 is a return spring for the anchor 3.

In operation of the thus constructed braking device of the present invention, when the lining 2a is worn from a long time of use so that there occurs a gap between the lining 2a and the peripheral surface of the brake drum 1 the result is that the stroke of the piston rod 7a of the hydraulic cylinder 7 is increased thereby so that this stroke exceeds the distance measured at the engaging portion 10a of the leaf spring 10 in its advance, the roller 11 provided at the end of the lever 8a is contacted with the engaging portion of the leaf spring 10 so that when the brake acts, and one-way clutch 8 is rotated in idling operation. Then, when the braking ceases, while the anchor 3 is returned by the return spring 14, the adjusting bolt 5 is rotated by the one-way clutch 8 engaged by the operation of the return spring 14 with the result that the gap between the lining 2a and the brake drum 1 is automatically adjusted. With respect to the prevention of excessive adjusting, in consideration with the slack amount of the brake band 2 when emergency braking occurs (this is caused by the excessive adjusting), there is provided a distance l at the end of the lever 8a with respect to the engaging portion 10a of the leaf spring 10, and thus it is not necessary to particularly provide a device for preventing the excessive adjusting which maintains simplicity of construction.

Figure 4:
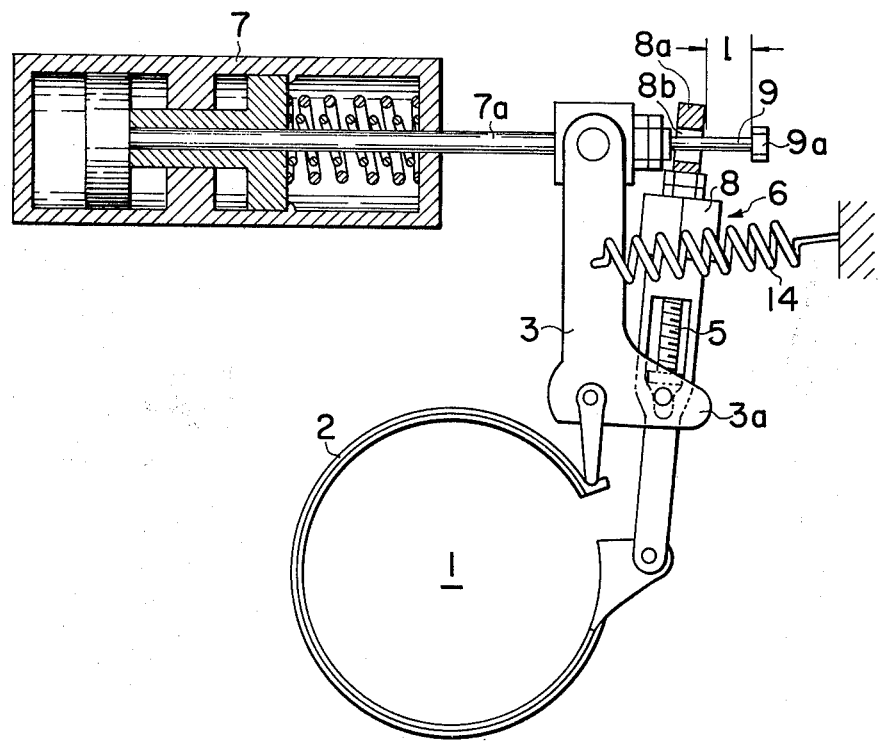
FIG. 4 is an explanatory view of another embodiment of the braking device.

Referring now to FIG. 4, which shows another embodiment of the braking device of the invention, means for rotating the one-way clutch 8 of the feed mechanism 6 is provided at the adjusting bolt 5 such that the engaging rod 9 projected from the end of the piston rod 7a is movably engaged with a hole 8b formed at the lever 8a of the one-way clutch 8 so as to rotate the lever 8a of the one-way clutch 8 with the engaging portion 9a provided at the end of the engaging rod 9.

It should be understood from the foregoing description that since the one-way clutch of the feed mechanism provided between the piston rod of the hydraulic cylinder and the adjusting bolt is idled upon braking when the gap between the lining and the brake drum exceeds a predetermined value, so as to release the braking and so that the adjusting bolt is rotated by the operation of the return spring of the anchor in the automatically adjusting braking device of the present invention, it is not anticipated that the braking force will be reduced by the wear of the lining such that the braking becomes impossible, thus the safety of the vehicle is remarkably improved. In addition, it should also be understood that, since the rotating timing of the one-way clutch is provided in consideration with the slack amount of the brake band when an emergency braking occurs, no possible excessive adjusting of the brake is caused so that a device for preventing excessive adjusting in the braking device of the present invention is not necessary, thus permitting the braking device to be easily provided at less expense.

What is claimed is:

1. An automatically adjusting braking device for a band brake, comprising a brake drum secured to a vehicle with a band element in engaging contact therearound with one end secured to an anchor means and the other end secured to an adjusting component wherein the anchor means is connected to a piston rod projecting from a hydraulic cylinder, with a feed mechanism located on the adjusting component and composed of a clutch adapted to be driven by an engaging rod projecting from said piston rod and wherein a return spring is connected to the anchor means.

2. An automatically adjusting braking device according to claim 1, wherein the feeding mechanism is provided at the upper enf of the adjusting component and is composed of a branch rod with a leaf spring thereon and a lever extending from the clutch to a roller element movably engaged with the leaf spring and a tension spring extending from the clutch to the branch rod.

3. An automatically adjusting braking device according to claim 2, wherein there is provided a means for rotating the clutch such that the engaging rod is movably engaged with a hole formed on the lever so as to permit rotation of said lever.

* * * * *